United States Patent [19]

Benton

[11] 4,431,265
[45] Feb. 14, 1984

[54] APPARATUS FOR VIEWING STEREOSCOPIC IMAGES

[75] Inventor: Stephen A. Benton, Lincoln, Mass.

[73] Assignee: Polaroid Corporation, Cambridge, Mass.

[21] Appl. No.: 221,846

[22] Filed: Dec. 31, 1980

[51] Int. Cl.³ .................. G02B 27/26; H04N 9/60
[52] U.S. Cl. .................................. 350/132; 358/3; 358/88
[58] Field of Search .......... 350/132, 130; 358/88, 358/91, 92, 3

[56] References Cited

U.S. PATENT DOCUMENTS

| | | | |
|---|---|---|---|
| 2,203,687 | 6/1940 | Land et al. | 350/132 |
| 2,237,567 | 4/1941 | Land | 350/397 |
| 2,281,101 | 4/1942 | Land | 350/132 |
| 2,289,714 | 7/1942 | Land | 350/396 |
| 2,298,058 | 10/1942 | Land | 351/49 |
| 4,122,484 | 10/1978 | Tan | 358/88 X |
| 4,247,177 | 1/1981 | Marks et al. | 351/132 X |

FOREIGN PATENT DOCUMENTS 2000605  1/1979  United Kingdom ............... 350/132

Primary Examiner—John K. Corbin
Assistant Examiner—Scott J. Sugarman
Attorney, Agent, or Firm—Louis G. Xiarhos

[57] ABSTRACT

Apparatus for viewing superposed stereographic images each presented in a different color, comprising a color television receiver having a dual dichroic polarizing filter over the viewing screen, and a pair of spectacles having orthogonally polarized lenses for viewing the screen through the filter.

6 Claims, 4 Drawing Figures

U.S. Patent  Feb. 14, 1984  4,431,265
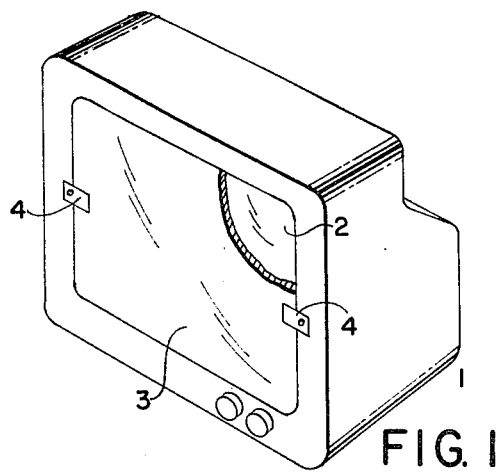
FIG. 1
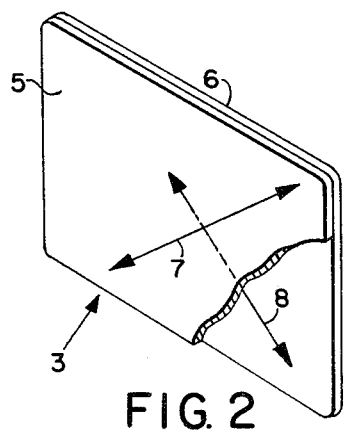
FIG. 2
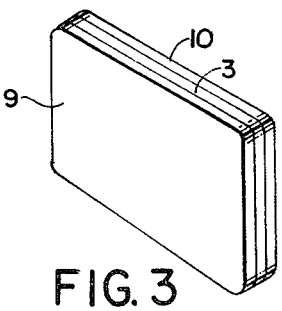
FIG. 3
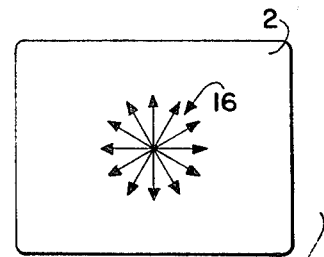
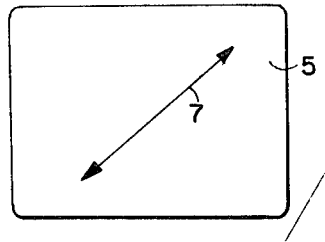
FIG. 4
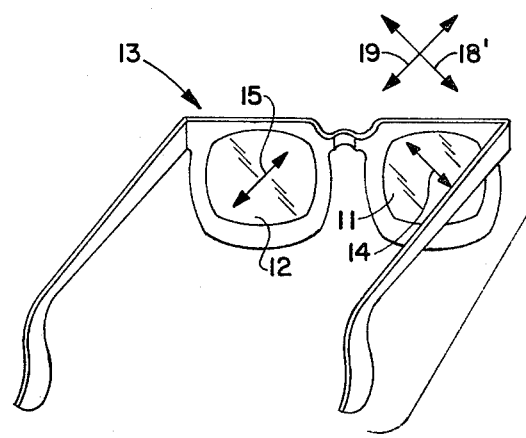

APPARATUS FOR VIEWING STEREOSCOPIC IMAGES

This invention relates to stereoscopy, and particularly to novel apparatus for viewing superposed stereoscopic images in which the right and left eye views are presented in different colors.

Various techniques for the preparation and viewing of superposed stereoscopic images have been developed. One method, described in U.S. Pat. No. 2,289,714, involves recording the right and left eye images on superposed sheets of orthogonally polarized dichroic polarizing materials, and viewing these images, projected on a non-depolarizing screen, through spectacles having orthogonally polarized lenses. Another way of recording superposed stereoscopic images is to record the right and left eye images in different colors. These images, termed anaglyphs, are then viewed through two filters of different colors, one for the left eye and one for the right. Anaglyphic motion pictures are described on pages 17–20 of *New Screen Techniques*, published by the Quigley Publishing Company in 1953 and edited by Martin Quigley, Jr.

It has long been desired to present stereoscopic images for viewing on television. However, to date no really satisfying approach to the recording and viewing of such images has been found. It is of course possible to transmit and receive color coded images recorded in the second manner described above. However, the viewing of such images through filters of different colors in the usual television viewing environment, with surrounding objects and people illuminated by ambient light, leaves much to be desired. The object of this invention is to facilitate the viewing of such images without interference with the view of the scene surrounding the images.

Briefly, the above and other objects of the invention are attained by placing over an image comprising superposed stereoscopic images in two different colors, two superposed orthogonally oriented dichroic filters. Components of the stereoscopic images transmitted through the superposed dichroic filters can be viewed through orthogonally oriented polarizers, one for each eye, to present a three dimensional view to the observer.

The invention will best be understood in the light of the following description, together with the accompanying drawings.

In the drawings,

FIG. 1 is a schematic perspective sketch of a television receiver provided with a dual dichroic filter in accordance with the invention, with parts broken away;

FIG. 2 is a perspective sketch of the dual filter of FIG. 1, on an enlarged scale;

FIG. 3 is a diagrammatic perspective sketch of a modification of the dual filter of FIG. 1; and FIG. 4 is a diagrammatic exploded perspective sketch illustrating the operation of apparatus in accordance with the invention for viewing color coded superposed stereoscopic images.

FIG. 1 shows a conventional color television receiver enclosed in a cabinet 1 and provided with the usual viewing screen 2. Mounted over the viewing screen 2 is a dual dichroic filter 3.

The dual dichroic filter 3 is preferably shaped to conform to the outer surface and external dimensions of the viewing screen 2, which will generally be of a convex compound curved shape. The filter 3 is preferably detachably mounted on the receiver, as by brackets 4 detachably or rotatably mounted on the cabinet 1. Alternatively, the filter may be of thermoplastic material that is flat in its unstressed state and sufficiently flexible to be conformed to the shape of the viewing screen by pressure exerted at the edges, and there held in place by appropriately located mounting means. If desired, the filter may be laminated to the viewing screen, or held in position by the bezel on the cabinet.

The dual dichroic filter 3 may be of the type described in U.S. Pat. No. 2,298,058, except that it is made to conform to the viewing screen of the television receiver that it is to be used with, at least in its two major dimensions of width and height, and that its spectral transmission properties should be matched to the requirements of the superposed spectroscopic images which it is desired to view.

In particular, with reference to FIG. 2, the dual dichroic filter 3 comprises two layers 5 and 6, which may be two separate sheets preferably laminated together, or two surface layers of the same sheet. The layers 5 and 6 comprise transparent plastic material containing oriented dye molecules, with the directions of orientation in the two sheets substantially at right angles as indicated by the arrow 7 for the sheet 5, and 8 for the sheet 6. As more fully described in U.S. Pat. No. 2,298,058, such materials may be made of sheets of linear high polymers oriented by stretching, and dyed either before or after stretching. Assuming that the dichroic dyes selected are the usual positive acting variety, each of the sheets will then transmit all light polarized in planes perpendicular to the direction of orientation of its molecules, as indicated by the arrows 7 and 8 for the layers 5 and 6, and will transmit only a band or bands of wavelengths determined by the dye that is polarized in planes parallel to the direction of orientation of the molecules. If negative acting dichroic dyes are employed, the axes of transmission will be perpendicular to those just described.

The arrows 7 and 8, as well as others representing planes of polarization to be described, are shown with double heads to symbolize oscillations in the represented planes. When considered as representing axes of transmission, it should be recalled that the only light polarized in planes parallel to one of the arrows 7 and 8 that is transmitted is that not absorbed by the layer, so that these should be thought of as axes of exclusive transmission.

A preferred material for the dual filter 3 is a laminate of two layers of polyvinyl alcohol, with one of the layers 5 and 6 dyed with a dichroic dye that will absorb the remaining portion of the visible spectrum. Opposite surface layers of the filter 3, comprising the layers 5 and 6, may be made with linearly oriented molecules in the layer 5 at right angles to those in the layer 6. The oriented and dyed layers 5 and 6 may be laminated together with a polyvinyl alcohol solution, as is known in the art. The direction of orientation of the layers 5 and 6 relative to the vertical or to the television screen 2 is not critical, although the 45 degree orientation to the vertical shown is preferred.

A variety of dichroic dyes and dye combinations can be employed, such as those described in U.S. Pat. Nos. 2,289,714 and 2,298,058. The only requirement for the dye colors is that the dye selected for the layer 5 should absorb one of the colors in which the stereoscopic images are presented and transmit the other, whereas the dye selected for the layer 6 should transmit the color absorbed by the layer 5 and absorb the color transmitted by the layer 5. However, for stereoscopic viewing of broadcast or recorded television images in an illuminated room, it is preferred to employ a complementary set for the layers 5 and 6 such that one layer will absorb approximately one half of the visible spectrum at one end of the spectrum, and the other layer will absorb the rest, such that when a standard color television image is viewed through the filter 3 and through orthogonally polarized neutral lenses, true colors will be seen, and white perceived as white. The filter 3 can then be permanently installed in front of or as a part of the television viewing screen, and a viewer will be able to see normal television programming with or without polarized glasses, or can watch stereoscopic television without interference with the view of surrounding objects through orthogonally polarized glasses of neutral tint. The latter is a considerable advantage over the red and green lenses previously employed for stereoscopic viewing.

One suitable complementary set of dyes that is suitable for the purpose here described is a deep red-orange, such as 1.02 percent by weight of Fastusol Red 4B (a red dye made and sold by GAF Corporation, of New York, N.Y.) and 0.3 percent by weight of Erie Yellow 2RFP in 98.68 percent by weight of water, based on the weight of solution, for one of the layers 5 and 6, and a blue-green dye, such as Solophenyl Fast Blue Green BL, made and sold by Ciba Geigy Corporation of Basel, Switzerland, for the other of the layers 5 and 6.

As shown in FIG. 3, the dual filter 3 is preferably laminated between two transparent protective sheets 9 and 10, of unoriented, nonbirefringent polystyrene, poly (methyl methacrylate), glass or the like.

The operation of the apparatus of FIGS. 1 and 2 or 3 will next be described. For simplicity, attention will be confined to red and green light components. The layer of the filter 3 which absorbs green light will be described as dyed red, and the layer which absorbs red light as dyed green. In fact, such a combination would be suitable for stereoscopic viewing, although the preferred dye colors are red-orange and blue-green for the reasons given above.

Assuming that a television signal made from a conventional red-green stereoscopic motion picture is supplied to the receiver of FIG. 1, either by broadcast or from a video recording, superposed red and green right and left eye views would be presented on the screen 2. With the dual filter 3 in place, the unaided observer would see approximately the same confused image as that on the screen 2, except that some light would be absorbed by the filter.

However, when viewed through orthogonally oriented polarizers, a three dimensional view would be presented in a manner next to be described with reference to FIG. 4.

In FIG. 4, the layers 5 and 6 are shown separated from each other and from the viewing screen 2 for expository purposes. A pair of polarizers 11 and 12 are shown mounted as lenses in spectacle frames 13 for the convenience of the viewer. The polarizers may be made as prescription lenses for an individual viewer, but in general would be simple polarizers of neutral tint and transmissive of light of all wavelengths polarized in the appropriate planes.

The polarizer 11 has its axis of transmission, indicated by the arrow 14, parallel to one of the axes of exclusive transmission of the layers 5 and 6, here shown as the axis of the layer 6 and indicated by the arrow 8. The axis of transmission of the polarizer 12, indicated by the arrow 15, is normal to the axis of the polarizer 11 and parallel to the axis of the layer 5. The choice of orientation of the polarizers 11 and 12 relative to the orientation of the polarizers 5 and 6 is made in dependence on whether the red or the green image is intended for the right eye, and which of the layers 5 and 6 is dyed red.

As indicated by the bundle of arrows 16 in FIG. 4, light from the television screen 2 is randomly polarized and consists of red and green components of the superposed images. Assuming that the red image is for the right eye, and that the layer 6 is dyed red and the layer 5 is dyed green, both red and green components polarized in planes perpendicular to the arrow 8 will be transmitted by the layer 6, as indicated by the arrow 17. Primarily only the red component of light polarized in planes parallel to the arrow 8, indicated by the arrow 18, will be transmitted. Portions of red and green light polarized in other planes, or unpolarized or circularly polarized light, will be transmitted in dependence on the relationship of the instantaneous plane of polarization to the principal planes of polarization just discussed. However, such components as are undesirable are progressively excluded in the manner next to be described to a sufficient degree as to cause no appreciable interference with the desired image rays.

The principle function of the layer 6 is to exclude green light from the transmitted rays polarized as indicated by the arrow 18. These transmitted red rays will be passed by the layer 5, as indicated by the arrow 18'. The function of the layer 5 is to exclude red light from that transmitted by the layer 6 and polarized as indicated by the arrow 17. The green light component polarized as indicated by the arrow 17 will be transmitted, as indicated by the arrow 19. An observer viewing the screen 2 through the dual filter comprising the layers 5 and 6 and the polarizers 11 and 12 will then see only the red image through the right eye and only the green image through the left eye.

For stereoscopic television viewing in the manner described above, it is not necessary that the superposed images be initially recorded by photography. The images may be recorded electronically, as with a pair of spaced black and white television cameras, the signals from which are supplied to conventional color synthesizers to produce stereoscopic color signals, and either broadcast live or recorded on video tape for later broadcasting or duplication for selective reproduction by a plurality of users.

While the invention has been described with reference to the details of specific embodiments, many changes and variations will occur to those skilled in the art upon reading this description. Such can obviously be made without departing from the scope of the invention.

Having thus described the invention, what is claimed is:

1. Apparatus for viewing a television image comprising superposed sterographic views of a scene in two colors, one for each view, displayed on a television screen, comprising: a dual dichroic polarizing filter comprising superposed orthogonally oriented dichroic layers, said filter being adapted to be placed over said screen for dissecting said image into orthogonally polarized components, each component comprising light from said superposed images in a different one of said colors, said filter being shaped to conform to the dimensions of said screen; means for detachably securing said filter over said screen; and a pair of spectacles having orthogonally polarized lenses oriented to present the correct one of said stereoscopic views to the eyes of an observer wearing said spectacles and viewing said screen through said lenses and said filter.

2. The apparatus of claim 1, in which said dual dichroic filter is of flexible sheet plastic material that is flat in an unstressed state and is adapted to be flexed into conformity with a generally convex television viewing screen, and in which said detachable mounting means are located in position to hold said filter in flexure in conformity with said screen.

3. The apparatus of claim 1, in which said filter is formed with curved parallel surfaces, one of which is adapted to conform to a generally convex surface of a television screen.

4. Apparatus for viewing superposed stereoscopic views of a scene in two colors, one for each view, comprising: a color television receiver having a viewing screen; a dual dichroic polarizing filter comprising superposed orthogonally oriented dichroic layers, said filter being adapted to fit over said viewing screen and being effective when mounted on said screen to dissect superposed stereoscopic images in said two colors into orthogonally polarized components, each component comprising light from said superposed images in a different one of said colors; and a pair of spectacles having orthogonally polarized lenses oriented to present the correct ones of said stereoscopic images to the eyes of an observer who is wearing said spectacles and viewing said screen through said lenses and said filter.

5. Apparatus for viewing superposed stereoscopic images displayed on the viewing screen of a color television receiver in first and second colors, comprising: a dual dichroic filter shaped to conform to said viewing screen and effective when mounted on said viewing screen to dissect superposed stereoscopic images in said first and second colors into orthogonally polarized components, each component comprising light from superposed images in a different one of said first and second colors; means for detachably securing said filter to said viewing screen; and a pair of polarizers mounted in spectacle frames, a first of said polarizers being oriented to selectively transmit light polarized in a first plane relative to said frames and located in said frames in the path of view of the right eye of a viewer wearing said frames, the other of said polarizers being oriented to selectively transmit light polarized in a second plane perpendicular to said first plane and located in said frames in the path of view of the left eye of the viewer wearing said frames; and dual filter comprising at least a first layer of an oriented linear polymer dyed to selectively transmit light of said first color polarized in a third plane relative to said filter; said dual filter comprising at least a second layer of an oriented polymer dyed to selectively transmit light of said second color polarized in a fourth plane perpendicular to said third plane; said third and fourth planes being oriented so that one is parallel to said second plane when said filter is in a predetermined position on said viewing screen and an observer is wearing said frames and looking toward said viewing screen.

6. Apparatus for viewing a television image comprising superposed stereographic views of a scene, one in red and one in green for each view, displayed on a television screen, comprising a dual dichroic polarizing filter adapted to be placed over said screen for dissecting said image into orthogonally polarized components, each component comprising light from a different one of said superposed images; said filter comprising two orthogonally oriented layers each dyed with different and complementary dichroic dyes, whereby the dyes in one layer selectively absorb a portion of the visible spectrum including red and excluding green and the dyes in the other layer selectively absorb the balance of the visible spectrum; means of securing said filter over said screen; and a pair of spectacles having orthogonally polarized neutrally tinted lenses oriented to present the correct one of said stereoscopic views to the eyes of an observer wearing said spectacles and viewing said screen through said lenses and said filter.

* * * * *